(12) United States Patent
Cheng et al.

(10) Patent No.: US 11,372,413 B2
(45) Date of Patent: Jun. 28, 2022

(54) METHOD AND APPARATUS FOR OUTPUTTING INFORMATION

(71) Applicant: Beijing Baidu Netcom Science And Technology Co., LTD., Beijing (CN)

(72) Inventors: Xinjing Cheng, Beijing (CN); Ruigang Yang, Beijing (CN); Yajue Yang, Beijing (CN); Feixiang Lu, Beijing (CN); Hao Xu, Beijing (CN)

(73) Assignee: Beijing Baidu Netcom Science and Technology Co., Ltd.

( * ) Notice: Subject to any disclaimer, the term of this patent is extended or adjusted under 35 U.S.C. 154(b) by 166 days.

(21) Appl. No.: 16/677,413

(22) Filed: Nov. 7, 2019

(65) Prior Publication Data

US 2020/0241537 A1 Jul. 30, 2020

(30) Foreign Application Priority Data

Jan. 25, 2019 (CN) .......................... 201910075860.4

(51) Int. Cl.
*G05D 1/02* (2020.01)
*E02F 9/26* (2006.01)

(52) U.S. Cl.
CPC ........... *G05D 1/0212* (2013.01); *E02F 9/265* (2013.01)

(58) Field of Classification Search
CPC .............................. G05D 1/0212; E02F 9/265
USPC .......................................................... 701/50
See application file for complete search history.

(56) References Cited

U.S. PATENT DOCUMENTS

| 7,457,698 | B2 * | 11/2008 | Danko | B25J 9/1607 |
| | | | | 701/50 |
| 10,794,046 | B2 * | 10/2020 | Imura | E02F 9/2221 |
| 2016/0258129 | A1 * | 9/2016 | Wei | E02F 9/2029 |
| 2016/0312434 | A1 * | 10/2016 | Shintani | E02F 3/43 |
| 2019/0078291 | A1 | 3/2019 | Shimano et al. | |
| 2019/0198339 | A1 * | 6/2019 | Chung | H01L 29/42324 |
| 2020/0181883 | A1 * | 6/2020 | Igarashi | E02F 3/435 |
| 2020/0277753 | A1 * | 9/2020 | Roh | E02F 3/435 |
| 2021/0108395 | A1 * | 4/2021 | Harada | E02F 9/2278 |
| 2021/0148091 | A1 * | 5/2021 | Takaoka | E02F 9/262 |

(Continued)

FOREIGN PATENT DOCUMENTS

| CN | 102947513 A | 2/2013 |
| CN | 102995673 A | 3/2013 |
| CN | 103147577 A | 6/2013 |

(Continued)

OTHER PUBLICATIONS

Japanese Office Action dated Jun. 15, 2021 in JP Application No. 2019-202061.

(Continued)

*Primary Examiner* — Yazan A Soofi
(74) *Attorney, Agent, or Firm* — Weaver Austin Villeneuve & Sampson LLP

(57) ABSTRACT

Embodiments of the present disclosure relate to a method and apparatus for outputting information. The method includes: acquiring a target excavating trajectory, the target excavating trajectory including at least two sub-trajectories; determining trajectory parameters of the at least two sub-trajectories; determining, based on the trajectory parameters, positions of a plurality of control points; and outputting the positions of the plurality of control points.

10 Claims, 6 Drawing Sheets

(56) References Cited

U.S. PATENT DOCUMENTS

2021/0156121 A1* 5/2021 Hayakawa ............. H04N 7/183

FOREIGN PATENT DOCUMENTS

| | | |
|---|---|---|
| CN | 107882103 A | 4/2018 |
| CN | 108643275 A | 10/2018 |
| CN | 108663991 A | 10/2018 |
| CN | 108999228 A | 12/2018 |
| JP | S62115505 A | 5/1987 |
| JP | S63194032 A | 8/1988 |
| JP | 2000017692 A | 1/2000 |
| JP | 2001026943 A | 1/2001 |
| JP | 2011036985 A | 2/2011 |
| JP | 2019183382 A | 10/2019 |
| KR | 10-2012-0004132 | 1/2012 |
| KR | 10-2018-0123000 | 11/2018 |

OTHER PUBLICATIONS

CN Office Action [No Translation] dated Jun. 29, 2021, in Application No. CN201910075860.4.
Xiao-Guang, G. et al., "Research on Design of Excavator Trajectory Planning Control System," [English Abstract only], 1006-9348(2018) 11-0277-04, 2018, 5 pages.

* cited by examiner

METHOD AND APPARATUS FOR OUTPUTTING INFORMATION

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure relate to the field of computer technology, and specifically to a method and apparatus for outputting information.

BACKGROUND

Mechanization of engineering construction in China has become a long-term development trend. Excavators undertake heavy earthwork tasks in constructional engineering such as civil engineering, water conservancy, mining, agriculture and forestry, oil fields and national defense, and are indispensable key equipment in construction.

Engineering construction and intelligence thereof are developed on the basis of mechanical and electrical integration of engineering machinery and in combination with computer automation. One of the purposes is to simplify the driver's operation, improve the power, economy and work efficiency of a vehicle, save energy and improve work quality.

SUMMARY

Embodiments of the present disclosure provide a method and apparatus for outputting information.

In a first aspect, an embodiment of the present disclosure provides a method for outputting information, including: acquiring a target excavating trajectory, the target excavating trajectory including at least two sub-trajectories; determining trajectory parameters of the at least two sub-trajectories; determining, based on the trajectory parameters, positions of a plurality of control points; and outputting the positions of the plurality of control points.

In some embodiments, the trajectory parameters include a length; and the determining, based on the trajectory parameters, the positions of a plurality of control points includes: determining, for each sub-trajectory of the at least two sub-trajectories, a number of control points in the sub-trajectory based on the length of the sub-trajectory; and determining the positions of the control points of the number.

In some embodiments, the sub-trajectory corresponds to a preset weight; and the determining the number of control points in the sub-trajectory based on the length of the sub-trajectory includes: determining, based on the length of the sub-trajectory and the preset weight corresponding to the sub-trajectory, the number of control points.

In some embodiments, the trajectory parameters include a curvature radius; and the preset weight corresponding to the sub-trajectory is determined by: determining, based on the curvature radius of the sub-trajectory, the weight corresponding to the sub-trajectory.

In some embodiments, distances between adjacent control points in the same sub-trajectory are identical.

In a second aspect, an embodiment of the present disclosure provides an apparatus for outputting information, including: a trajectory acquisition unit, configured to acquire a target excavating trajectory, the target excavating trajectory including at least two sub-trajectories; a parameter determination unit, configured to determine trajectory parameters of the at least two sub-trajectories; a position determination unit, configured to determine, based on the trajectory parameters, positions of a plurality of control points; and a position output unit, configured to output the positions of the plurality of control points.

In some embodiments, the trajectory parameters include a length; and the position determination unit is further configured to: determine, for each sub-trajectory of the at least two sub-trajectories, the number of control points in the sub-trajectory based on the length of the sub-trajectory; and determine the positions of the control points of the number.

In some embodiments, the sub-trajectory corresponds to a preset weight; and the position determination unit is further configured to: determine, based on the length of the sub-trajectory and the preset weight corresponding to the sub-trajectory, the number of control points in the sub-trajectory.

In some embodiments, the trajectory parameters include a curvature radius; and the apparatus further includes a weight determination unit configured to: determine, based on the curvature radius of the sub-trajectory, the weight corresponding to the sub-trajectory.

In some embodiments, distances between adjacent control points in the same sub-trajectory are identical.

In a third aspect, an embodiment of the present disclosure provides a device, including: one or more processors; and a storage apparatus storing one or more programs, the one or more programs, when executed by the one or more processors, causing the one or more processors to implement the method described in any embodiment of the first aspect.

In a fourth aspect, an embodiment of the present disclosure provides a computer readable medium storing a computer program, where when the program is executed by a processor, the method described in any embodiment of the first aspect is implemented.

In the method and apparatus for outputting information according to some embodiments of the present disclosure, a target excavating trajectory may be acquired first. The target excavating trajectory includes at least two sub-trajectories. Then, trajectory parameters of at least two sub-trajectories may be determined. Next, positions of a plurality of control points are determined based on the trajectory parameters. Finally, the positions of the plurality of control points are outputted. The method of the present embodiment can reasonably set the control points for the target excavating trajectory, thereby ensuring the excavating precision of an excavator, and ensuring the excavating efficiency of the excavator.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
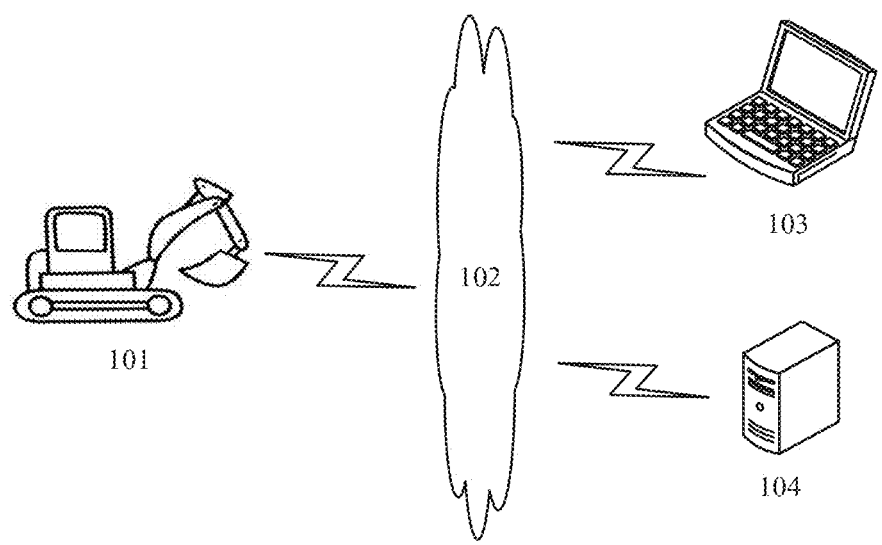
FIG. 1 is a diagram of an example system architecture in which an embodiment of the present disclosure may be implemented.

FIG. 1 shows an example system architecture 100 in which a method for outputting information or an apparatus for outputting information according to embodiments of the present disclosure may be implemented.

As shown in FIG. 1, the system architecture 100 may include an excavator 101, a network 102, a terminal device 103, and a server 104. The network 102 serves as a medium providing a communication link among the excavator 101, the terminal device 103, and the server 104. The network 102 may include various types of connections, such as wired or wireless communication links, or optical fiber cables.

The excavator 101 may be used to perform an excavation task. Specifically, the excavator 101 may include a bucket, and the excavator 101 may perform the excavation task by controlling the position of the bucket. An excavator driver may also manually operate the excavator 101 to perform the excavation task.

The terminal device 103 may interact with the excavator 101 through the network 102 to receive or send messages, etc. For example, the terminal device 103 may set control points for an excavating trajectory and then send the positions of the control points to the excavator 101. The terminal device 103 may be installed with various communication client applications, such as web browser applications, shopping applications, search applications, instant messaging tools, mailbox clients, or social platform software.

The terminal device 103 may be hardware or software. When being hardware, the terminal device 103 may be various electronic devices, including but not limited to a smart phone, a tablet computer, a laptop computer, a desktop computer, etc. When being software, the terminal device 103 may be installed in the above-listed electronic devices. The terminal device 103 may be implemented as a plurality of software programs or software modules (e.g., for providing distributed services), or as a single software program or software module, specific limitations are not provided here.

The server 104 may be a server for providing various services, for example, a backend server that provides a support for the excavation task performed by the excavator 101. The backend server may process data such as the excavating trajectory and feed back the processing result (for example, the positions of the control points) to the excavator 101.

It should be noted that the server 104 may be hardware or software. When being hardware, the server 104 may be implemented as a distributed server cluster composed of multiple servers, or as a single server. When being software, the server 104 may be implemented as a plurality of software programs or software modules (e.g., for providing distributed services), or as a single software program or software module, specific limitations are not provided here.

It should be noted that the method for outputting information according to some embodiments of the present disclosure may be performed by the terminal device 103 or the server 104. Accordingly, the apparatus for outputting information may be provided in the terminal device 103 or the server 104.

It should be understood that the numbers of the excavator, the terminal device, the network and the server in FIG. 1 are merely illustrative. Any number of excavators, terminal devices, networks and servers may be provided based on actual requirements.

Figure 2:
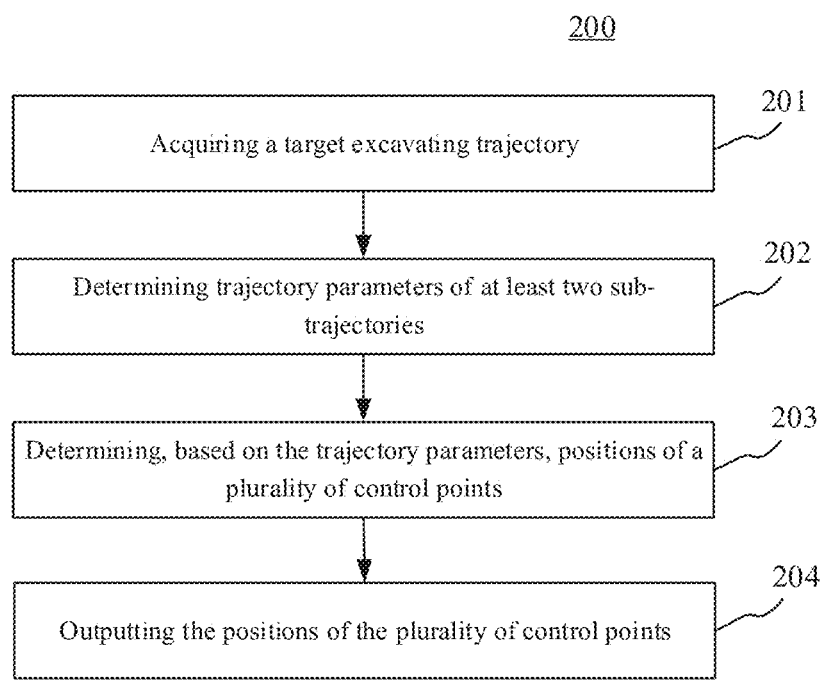
FIG. 2 is a flowchart of a method for outputting information according to an embodiment of the present disclosure.

Further referring to FIG. 2, a flow 200 of a method for outputting information according to an embodiment of the present disclosure is shown. The method for outputting information according to the present embodiment includes the following steps.

Step 201: Acquiring A Target Excavating Trajectory.

In the present embodiment, the executing body (for example, the terminal device 103 or the server 104 shown in FIG. 1) of the method for outputting information may acquire the target excavating trajectory through a wired or wireless connection. The target excavating trajectory may be a trajectory of bucket teeth of an excavator. The target excavating trajectory may include at least two sub-trajectories. In some application scenarios, the target excavating trajectory may include four sub-trajectories of "insertion", "dragging", "rotation", and "lifting". "Insertion" indicates a trajectory that the bucket is inserted into the inside of a to-be-excavated object. "Dragging" indicates a trajectory that the bucket is dragged inside the to-be-excavated object. "Rotation" indicates a trajectory that the bucket carries materials to rotate. "Lifting" indicates a trajectory that the bucket lifts the materials from the inside of the to-be-excavated object.

Step 202: Determining Trajectory Parameters of at Least Two Sub-Trajectories.

In the present embodiment, the target excavating trajectory may be expressed by trajectory parameters. The trajectory parameters may include, but are not limited to, a starting position, an ending position, a length, and an angle. It can be understood that the trajectory parameters of each sub-trajectory may be the same or different. For example, the target excavating trajectory may include four sub-trajectories, which are respectively "insertion", "dragging", "rotation", and "lifting". The trajectory parameters of "insertion" may include a starting position and an ending position. The trajectory parameter of "dragging" may include a distance. The trajectory parameters of "rotation" may include an angle and an ending position. The trajectory parameter of "lifting" may include a height. It can be understood that the sub-trajectories are sequentially connected in a preset order, and the ending position of the previous sub-trajectory is the same as the starting position of the latter sub-trajectory.

Step 203: Determining, Based on the Trajectory Parameters, Positions of a Plurality of Control Points.

After determining the trajectory parameters of each sub-trajectory, the executing body may determine the positions of the plurality of control points based on the trajectory parameters. In the present embodiment, the control points may be points for indicating the target excavating trajectory. The control points are linearly connected in series, and the obtained fold line may be approximate to the target excavating trajectory. The excavator may control the positions of the bucket teeth based on the positions of the control points to complete an excavation task. For each sub-trajectory, the executing body may set the starting position or ending position of the sub-trajectory as the position of the control point. Alternatively, the executing body may divide the sub-trajectory into a plurality of segments based on the length of the sub-trajectory. The starting or ending point of each segment is set as a control point, and then the position of each control point is determined based on the starting position or ending position of the sub-trajectory.

Step 204: Outputting the Positions of the Plurality of Control Points.

After determining the position of each control point, the executing body may output the positions of the plurality of control points. Specifically, the executing body may output the positions of the plurality of control points to the excavator, so that the excavator performs the excavation task based on the positions of the control points. Alternatively, the executing body may also output the positions of the plurality of control points to a terminal used by the technician for reviewing the positions of the control points.

Figure 3:
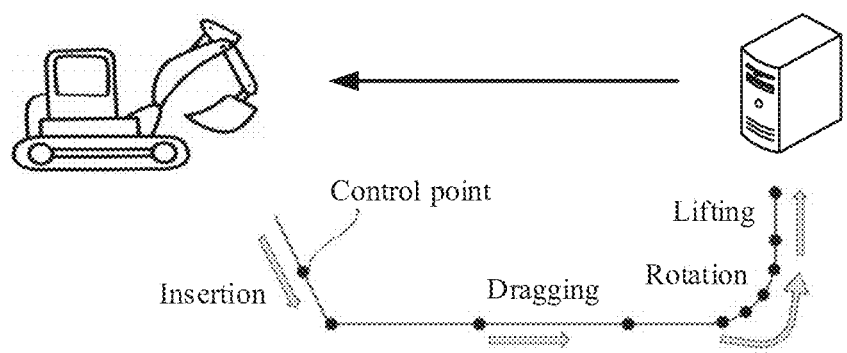
FIG. 3 is a flowchart of an application scenario of the method for outputting information according to an embodiment of the present disclosure.

Further refer to FIG. 3, which is a schematic diagram of an application scenario of the method for outputting information according to the present embodiment. In the application scenario of FIG. 3, the server may acquire a target excavating trajectory locally. The target excavating trajectory includes four parts: "insertion", "dragging", "rotation", and "lifting". The trajectory parameters of "insertion" include a starting position and an ending position. The trajectory parameter of "dragging" includes a distance. The trajectory parameters of "rotation" include an angle and an ending position. The trajectory parameter of "lifting" includes a height. Finally, the executing body may determine the positions of control points (dots in the figure) in sub-trajectories, and output the positions of the control points to the excavator to perform the excavation task.

In the method for outputting information according to some embodiments of the present disclosure, a target excavating trajectory may be acquired first. The target excavating trajectory includes at least two sub-trajectories. Then, trajectory parameters of at least two sub-trajectories may be determined. Next, the positions of a plurality of control points are determined based on the trajectory parameters. Finally, the positions of the plurality of control points are outputted. The method of the present embodiment can reasonably set the control points for the target excavating trajectory, thereby ensuring the excavating precision of an excavator, and ensuring the excavating efficiency of the excavator.

Figure 4:
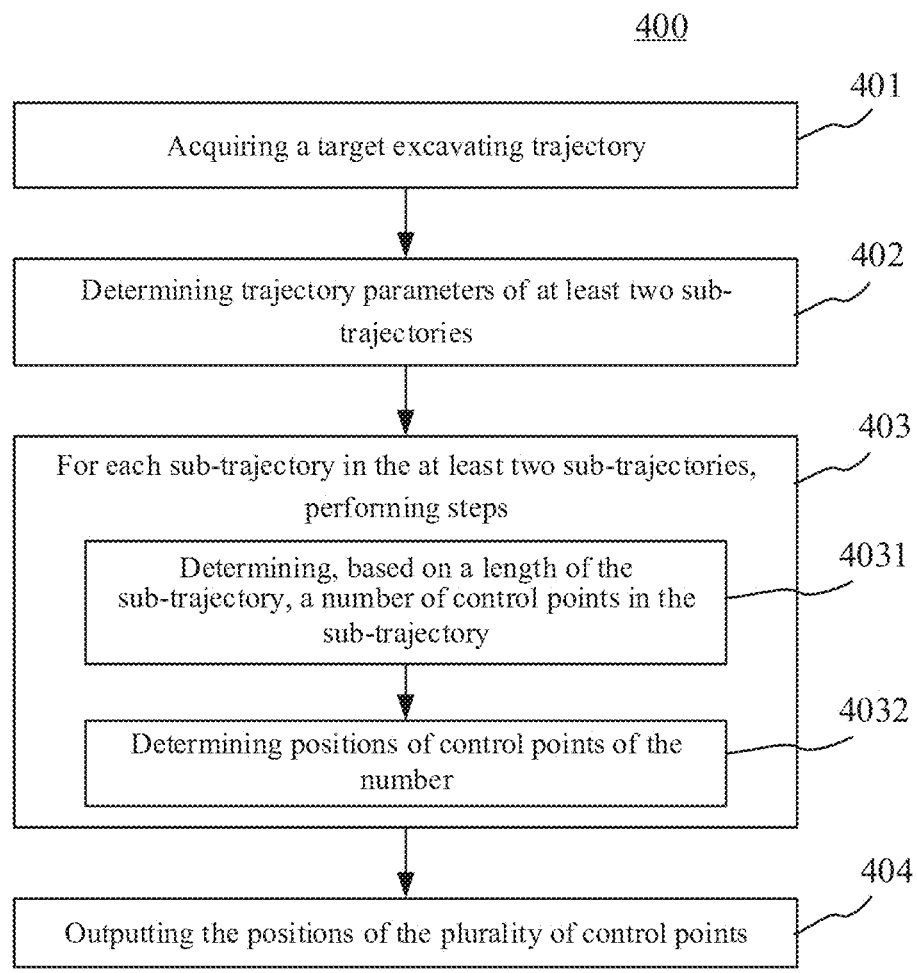
FIG. 4 is a flowchart of the method for outputting information according to another embodiment of the present disclosure.

Further referring to FIG. 4, a flow 400 of a method for outputting information according to another embodiment of the present disclosure is shown. As shown in FIG. 4, the method of the present embodiment may include the following steps.

Step 401: Acquiring a Target Excavating Trajectory.

The principle of this step is similar to that of step 201, and details are not described herein again.

Step 402: Determining Trajectory Parameters of at Least Two Sub-Trajectories.

In the present embodiment, the target excavating trajectory may be expressed by trajectory parameters. The trajectory parameters may include a length.

Step 403: For Each Sub-Trajectory of the at Least Two Sub-Trajectories, Performing Steps 4031~4032.

After determining the length of each sub-trajectory, the executing body may perform the following steps.

Step 4031: Determining, Based on a Length of the Sub-Trajectory, a Number of Control Points in the Sub-Trajectory.

After determining the length of each sub-trajectory, the executing body may determine the number of control points in the sub-trajectory. For example, the executing body may compare the length of each sub-trajectory with a preset threshold, and determine, if the length is smaller than or equal to the preset threshold, the number of control points in the sub-trajectory to be 2. If the length is greater than the preset threshold, the sub-trajectory is divided into a plurality of segments, and the length of each segment is within a preset length range.

In some optional implementations of the present embodiment, each sub-trajectory corresponds to a preset weight. Step 4032 may be implemented by the following steps not shown in FIG. 4: determining, based on the length of the sub-trajectory and the preset weight corresponding to the sub-trajectory, the number of control points in the sub-trajectory.

In this implementation, the executing body may also determine, based on the length of each sub-trajectory and the preset weight corresponding to the sub-trajectory, the number of control points in the sub-trajectory. For example, the executing body may first determine a first number based on the length of the sub-trajectory, then determine a second number based on the weight of the sub-trajectory, and finally select the maximum of the first number and the second number as the number of control points. The executing body may determine the second number based on a corresponding relationship between pre-stored weights and numbers of control points.

In some optional implementations of the present embodiment, the trajectory parameters may further include a curvature radius. It can be understood that, if the curvature radius is smaller, the precision of the sub-trajectory is higher. In order to accurately represent the sub-trajectory, the sub-trajectory requires more control points. Therefore, when the curvature radius of the sub-trajectory is small, the weight of the sub-trajectory is large. The preset weight corresponding to the sub-trajectory may be determined by the following step: determining, based on the curvature radius of the sub-trajectory, the weight corresponding to the sub-trajectory.

In this implementation, the weight corresponding to the sub-trajectory may be determined based on the curvature radius of the sub-trajectory to improve the accuracy of the excavating trajectory during execution.

Step 4032: Determining Positions of Control Points of the Number.

After determining the number of control points, the executing body may determine the positions of the control points. Specifically, the executing body may equally divide the control points in the sub-trajectories.

Step 404: Outputting the Positions of the Plurality of Control Points.

The principle of this step is the same as that of step 204, and details are not described herein again.

In some optional implementations of the present embodiment, the distances between adjacent control points in the same sub-trajectory are the same.

In this implementation, distances between adjacent control points in the same sub-trajectory are identical. It can be understood that, if the distance between the control points is longer, the bucket is more likely to produce an error during driving. In order to avoid different accuracy caused by different distances between the control points in the same sub-trajectory, the distances between the adjacent control points in the same sub-trajectory are set to be the same.

The method for outputting information according to some embodiments of the present disclosure may determine the number of control points based on the length and weight of the sub-trajectory, thereby improving the accuracy of execution of the excavating trajectory.

Figure 5:
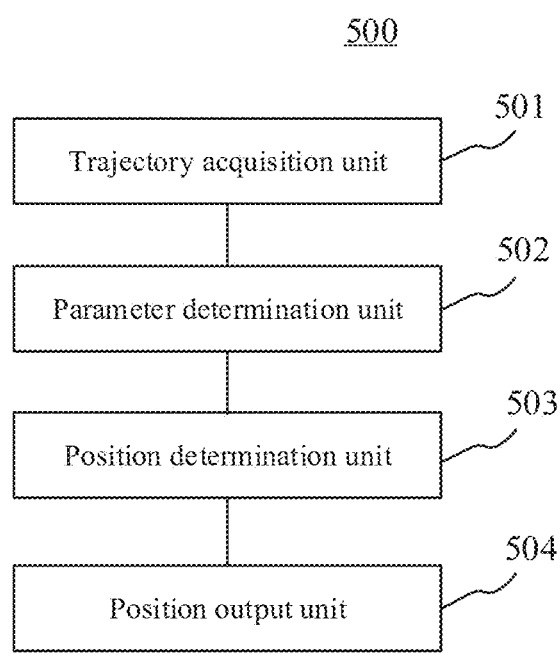
FIG. 5 is a schematic structural diagram of an apparatus for outputting information according to an embodiment of the present disclosure.

Further referring to FIG. 5, as an implementation of the method shown in the above figures, an embodiment of the present disclosure provides an apparatus for outputting information. An embodiment of the apparatus may correspond to the embodiment of the method shown in FIG. 2, and the apparatus may be applied to various electronic devices.

As shown in FIG. 5, the apparatus 500 for outputting information according to the present embodiment includes a trajectory acquisition unit 501, a parameter determination unit 502, a position determination unit 503, and a position output unit 504.

The trajectory acquisition unit 501 is configured to acquire a target excavating trajectory. The target excavating trajectory includes at least two sub-trajectories.

The parameter determination unit 502 is configured to determine trajectory parameters of at least two sub-trajectories.

The position determination unit 503 is configured to determine, based on the trajectory parameters, positions of a plurality of control points.

The position output unit 504 is configured to output the positions of the plurality of control points.

In some optional implementations of the present embodiment, the trajectory parameters may include a length. The position determination unit 503 may be further configured to: determine, for each sub-trajectory of the at least two sub-trajectories, a number of control points in the sub-trajectory based on the length of the sub-trajectory; and determine the positions of the control points of the number.

In some optional implementations of the present embodiment, each sub-trajectory corresponds to a preset weight. The position determination unit 503 may be further configured to determine, based on the length of the sub-trajectory and the preset weight corresponding to the sub-trajectory, the number of control points in the sub-trajectory.

In some optional implementations of the present embodiment, the trajectory parameters include a curvature radius. The apparatus 500 may further include a weight determination unit not shown in FIG. 5, configured to determine, based on the curvature radius of the sub-trajectory, the weight corresponding to the sub-trajectory.

In some optional implementations of the present embodiment, distances between adjacent control points in the same sub-trajectory are identical.

In the apparatus for outputting information according to some embodiments of the present disclosure, a target excavating trajectory may be acquired first. The target excavating trajectory includes at least two sub-trajectories. Then, trajectory parameters of at least two sub-trajectories may be determined. Next, the positions of a plurality of control points are determined based on the trajectory parameters. Finally, the positions of the plurality of control points are outputted. The apparatus of the present embodiment can reasonably set the control points for the target excavating trajectory, thereby ensuring the excavating precision of an excavator, and ensuring the excavating efficiency of the excavator.

It should be understood that the units 501 to 504 described in the apparatus 500 for outputting information respectively correspond to the steps in the method described with reference to FIG. 2. Therefore, the operations and characteristics described for the method for outputting information are also suitable for the apparatus 500 and the units included therein, and details are not described herein again.

Hereinafter, referring to FIG. 6, a schematic structural diagram of a device (for example, the server or terminal device in FIG. 1) 600 adapted to implement some embodiments of the present disclosure is shown. The terminal device in some embodiments of the present disclosure may include, but is not limited to, mobile terminals such as a mobile phone, a notebook computer, a digital broadcast receiver, a PDA (Personal Digital Assistant), a PAD (Tablet Computer), a PMP (Portable Multimedia Player), and a vehicle terminal (e.g., a vehicle navigation terminal), and fixed terminals such as a digital TV and a desktop computer. The terminal device or server shown in FIG. 6 is merely an example, and should not bring any limitations to the function and scope of use of some embodiments of the present disclosure.

Figure 6:
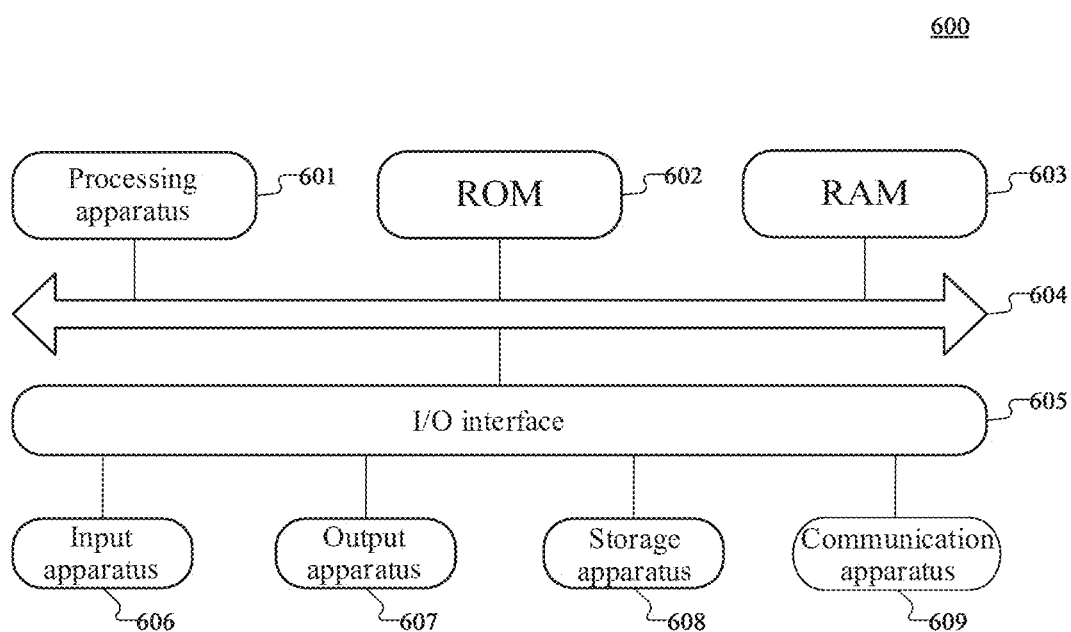
FIG. 6 is a schematic structural diagram of a computer system adapted to implement a device of embodiments of the present disclosure.

As shown in FIG. 6, the device 600 may include a processing apparatus (e.g., a central processing unit, a graphics processing unit, etc.) 601, which may execute various appropriate operations and processes according to a program stored in a read-only memory (ROM) 602 or a program loaded into a random access memory (RAM) 603 from a storage apparatus 608. The RAM 603 also stores various programs and data required by the operations of the electronic device 600. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 including, for example, a touch screen, a touch pad, a keyboard, a mouse, a camera, a microphone, an accelerometer, a gyroscope, etc.; an output apparatus 607 including, for example, a liquid crystal display (LCD), a speaker, a vibrator, etc.; a storage apparatus 608 including, for example, a magnetic tape, a hard disk, etc.; and a communication apparatus 609. The communication apparatus 609 may allow wireless or wired communication between the electronic device 600 and other device to exchange data. Although FIG. 6 illustrates the electronic device 600 having various apparatuses, it should be understood that all the illustrated apparatuses are not required to be implemented or included. More or less apparatuses may be alternatively implemented or included. Each block shown in FIG. 6 may represent one apparatus or a plurality of apparatuses as required.

In particular, according to some embodiments of the present disclosure, the process described above with reference to the flowchart may be implemented in a computer software program. For example, an embodiment of the present disclosure provides a computer program product including a computer program loaded to a computer readable medium, the computer program including a program code for executing the method shown in the flowchart. In such an embodiment, the computer program may be downloaded and installed from a network via the communication apparatus 609, or installed from the storage apparatus 608, or installed from the ROM 602. The computer program, when executed by the processing apparatus 601, implements the above functions defined in the method of some embodiments of the present disclosure. It should be noted that the computer readable medium according to some embodiments of the present disclosure may be a computer readable signal medium or a computer readable storage medium or a combination of the two. An example of the computer readable storage medium may be, but is not limited to: electric, magnetic, optical, electromagnetic, infrared, or semiconductor systems, apparatuses, elements, or any combination of the above. The computer readable storage medium, for more specific examples, may include but not limited to: an electrical connection with one or more leads, a portable computer disk, a hard disk, a random access memory (RAM), a read-only memory (ROM), an erasable programmable read-only memory (EPROM or flash), an optical fiber, a portable compact disk read-only memory (CD-ROM), an optical storage device, a magnetic storage device, or any appropriate combination of them. In some embodiments of the present disclosure, the computer readable storage medium may be any tangible medium containing or storing programs which may be used by an instruction execution system, apparatus or device or incorporated thereto. In some embodiments of the present disclosure, the computer readable signal medium may include data signals in base bands or propagated as part of carriers, in which computer readable program codes are carried. The data signals propagated may be in multiple forms, including but not limited to electromagnetic signals, optical signals or any appropriate combination of them. The computer readable signal medium may also be any computer readable medium except the computer readable storage medium. The computer readable signal medium is capable of sending, propagating or transmitting a program used by an instruction execution system, apparatus or device or a combination of them. The program codes included in the computer readable medium may be transmitted by any appropriate medium, including but not limited to a wire, an optical cable, RF (Radio Frequency), etc., or any appropriate combination of them.

The computer readable medium may be included in the above device, or exists alone and is not assembled into the electronic device. The computer readable medium carries one or more programs, the one or more programs, when executed by the electronic device, causing the electronic device to: acquire a target excavating trajectory, the target excavating trajectory including at least two sub-trajectories; determine trajectory parameters of the at least two sub-trajectories; determine, based on the trajectory parameters, a positions of a plurality of control points; and output the positions of the plurality of control points.

Computer program codes for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program codes may be completely executed on a user's computer, partially executed on a user's computer, executed as a separate software package, partially executed on a user's computer and partially executed on a remote computer, or completely executed on a remote computer or a server. In the circumstance involving a remote computer, the remote computer may be connected to a user's computer through any network, including a local area network (LAN) or a wide area network (WAN), or connected to an external computer (for example, connected through Internet using an Internet service provider).

The flowcharts and block diagrams in the drawings illustrate system architectures, functions and operations that may be implemented according to the systems, methods and computer program products of various embodiments of the present disclosure. In this regard, each box in the flowcharts or block diagrams may represent a module, a program segment, or a part of a code, which includes one or more executable instructions for implementing the specified logical functions. It should be noted that, in some alternative implementations, the functions marked in the boxes may also be implemented in an order different from that marked in the drawing. For example, two consecutive boxes substantially may be executed in parallel, or sometimes executed in a reverse order, depending on the involved functions. It should also be noted that, each box in the block diagrams and/or flowcharts, and a combination of boxes in the block diagrams and/or flowcharts may be implemented by a dedicated hardware-based system for executing specified functions or operations, or implemented by a combination of dedicated hardware and computer instructions.

The units described in some embodiments of the present disclosure may be implemented by software or hardware. The units described may also be set in a processor, for example, described as a processor includes a trajectory acquisition unit, a parameter determination unit, a position determination unit, and a position output unit. The names of these units do not constitute limitations to such units themselves in some cases. For example, the trajectory acquisition unit may also be described as "a unit for acquiring a target excavating trajectory."

The above description only provides an explanation of embodiments of the present disclosure and the technical principles used. It should be appreciated by those skilled in the art that the inventive scope of some embodiments of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical solutions formed by the above-described features being interchanged with, but not limited to, technical features with similar functions disclosed in some embodiments of the present disclosure are examples.

What is claimed is:

1. A method for outputting information, comprising:
   acquiring a target excavating trajectory, the target excavating trajectory comprising at least two sub-trajectories;
   determining trajectory parameters of the at least two sub-trajectories, the trajectory parameters comprising a length of each sub-trajectory and a weight of each sub-trajectory;
   determining, based on the trajectory parameters, positions of a plurality of control points; and
   outputting the positions of the plurality of control points,
   wherein determining, based on the trajectory parameters, positions of a plurality of control points comprises:
   for each sub-trajectory, determining a number of control points based on the length and the weight of the sub-trajectory, and determining positions of the number of control points.

2. The method according to claim 1, wherein the trajectory parameters comprise a curvature radius; and
the preset weight corresponding to the sub-trajectory is determined by:
determining, based on the curvature radius of the sub-trajectory, the weight corresponding to the sub-trajectory.

3. The method according to claim 1, wherein distances between adjacent control points in the same sub-trajectory are identical.

4. An apparatus for outputting information, comprising:
at least one processor; and
a memory storing instructions, the instructions when executed by the at least one processor, cause the at least one processor to perform operations, the operations comprising:
acquiring a target excavating trajectory, the target excavating trajectory comprising at least two sub-trajectories;
determining trajectory parameters of the at least two sub-trajectories, the trajectory parameters comprising a length of each sub-trajectory and a weight of each sub-trajectory;
determining, based on the trajectory parameters, positions of a plurality of control points; and
outputting the positions of the plurality of control points,
wherein determining, based on the trajectory parameters, positions of a plurality of control points comprises:
for each sub-trajectory, determining a number of control points based on the length and the weight of the sub-trajectory, and determining positions of the number of control points.

5. The apparatus according to claim 4, wherein the trajectory parameters comprise a curvature radius; and
the preset weight corresponding to the sub-trajectory is determined by:
determining, based on the curvature radius of the sub-trajectory, the weight corresponding to the sub-trajectory.

6. The apparatus according to claim 4, wherein distances between adjacent control points in the same sub-trajectory are identical.

7. A non-transitory computer readable medium storing a computer program, wherein the computer program, when executed by a processor, causes the processor to perform operations, the operations comprising:
acquiring a target excavating trajectory, the target excavating trajectory comprising at least two sub-trajectories;
determining trajectory parameters of the at least two sub-trajectories, the trajectory parameters comprising a length of each sub-trajectory and a weight of each sub-trajectory;
determining, based on the trajectory parameters, positions of a plurality of control points; and
outputting the positions of the plurality of control points,
wherein determining, based on the trajectory parameters, positions of a plurality of control points comprises:
for each sub-trajectory, determining a number of control points based on the length and the weight of the sub-trajectory, and determining positions of the number of control points.

8. The method according to claim 1, wherein the sub-trajectory comprises an insertion trajectory representing a trajectory of the bucket inserting into inside of a to-be-excavated object, a dragging trajectory representing a trajectory of the bucket being dragged inside the to-be-excavated object, a rotation trajectory representing a trajectory of the bucket carrying materials to rotate, and a lifting trajectory representing a trajectory of the bucket lifting the materials from the inside of the to-be-excavated object.

9. The method according to claim 1, wherein for each sub-trajectory, determining a number of control points based on the length and the weight of the sub-trajectory, and
determining positions of the number of control points, comprises:
determining a first number based on the length of the sub-trajectory; and determining a second number based on the weight of the sub-trajectory, the second number being determined based on a corresponding relationship between pre-stored weights and numbers of control points; and
selecting a maximum of the first number and the second number as the number of control points for the sub-trajectory.

10. The method according to claim 2, wherein the smaller the curvature radius of the sub-trajectory is, the larger weight of the sub-trajectory is.

* * * * *